United States Patent
Sinha et al.

(10) Patent No.: US 10,732,947 B2
(45) Date of Patent: *Aug. 4, 2020

(54) INFORMATION-TECHNOLOGY WORKFLOW USING TILES THAT DECLARATIVELY SPECIFY DATATYPES

(71) Applicant: VMware, Inc., Palo Alto, CA (US)

(72) Inventors: Rakesh Sinha, Sunnyvale, CA (US); Vishwas Nagaraja, Sunnyvale, CA (US); Danny Holzman, San Francisco, CA (US); Arjun Dube, San Carlos, CA (US)

(73) Assignee: WMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/458,520

(22) Filed: Mar. 14, 2017

(65) Prior Publication Data

US 2018/0165113 A1  Jun. 14, 2018

Related U.S. Application Data

(60) Provisional application No. 62/431,986, filed on Dec. 9, 2016.

(51) Int. Cl.
| | |
|---|---|
| *G06F 8/20* | (2018.01) |
| *G06F 8/36* | (2018.01) |
| *G06F 8/30* | (2018.01) |
| *G06F 9/455* | (2018.01) |
| *G06F 8/65* | (2018.01) |
| *G06F 8/60* | (2018.01) |
| *G06Q 10/10* | (2012.01) |

(Continued)

(52) U.S. Cl.
CPC .............. *G06F 8/60* (2013.01); *G06F 3/0482* (2013.01); *G06F 8/24* (2013.01); *G06F 8/31* (2013.01); *G06F 9/4881* (2013.01); *G06Q 10/103* (2013.01)

(58) Field of Classification Search
CPC ............................... G06F 8/24; G06F 9/45558
USPC .......................................... 717/104; 718/105
See application file for complete search history.

(56) References Cited

U.S. PATENT DOCUMENTS

| | | |
|---|---|---|
| 5,289,574 A | 2/1994 | Sawyer |
| 5,301,320 A | 4/1994 | McAtee et al. |
| 5,710,921 A | 1/1998 | Hirose |

(Continued)

OTHER PUBLICATIONS

Motto, "Creating your first Angular 2+ component", Mar. 17, 2016, online at <toddmotto.com/creating-your-first-angular-2-component#property-binding-to-an-input> (Year: 2016).*

*Primary Examiner* — James D. Rutten

(57) ABSTRACT

A workflow is expressed as an arrangement of a set of executable tile. In some embodiments, the tiles include operations expressed in different programming languages. A tile can include a declarative specification of datatypes so that external agents, e.g., workflow services, can identify the datatypes and schemas required as arguments and produced as result; this simplifies the defining of a workflow, e.g., by a workflow coder. A tile can have zero, one, or plural user interfaces; selection of a user interface from plural user interfaces can be based on a user selection, on user roles, or on tile lifecycle stage. Workflow services can communicate with each other so that workflows can be distributed and shifted among processor nodes.

13 Claims, 16 Drawing Sheets

(51) Int. Cl.
*G06F 9/48* (2006.01)
*G06F 3/0482* (2013.01)

(56) References Cited

U.S. PATENT DOCUMENTS

| | | | |
|---|---|---|---|
| 5,745,687 A | 4/1998 | Randell | |
| 5,826,239 A | 10/1998 | Du et al. | |
| 6,424,948 B1 | 7/2002 | Dong et al. | |
| 7,100,147 B2 | 8/2006 | Miller et al. | |
| 7,316,016 B2* | 1/2008 | DiFalco | H04L 41/0893 706/45 |
| 7,577,909 B2* | 8/2009 | Harriger | G06F 9/451 715/738 |
| 8,464,206 B2* | 6/2013 | Jenkins | G06Q 10/063 717/103 |
| 9,389,929 B1 | 7/2016 | Eshwar et al. | |
| 9,417,888 B2 | 8/2016 | Forstall et al. | |
| 10,025,460 B1* | 7/2018 | Almand | G06F 3/0482 |
| 2003/0131040 A1 | 7/2003 | Braun et al. | |
| 2003/0153994 A1 | 8/2003 | Jin et al. | |
| 2004/0187089 A1* | 9/2004 | Schulz | G06Q 10/06 717/101 |
| 2005/0160398 A1* | 7/2005 | Bjornson | G06Q 10/06 717/104 |
| 2005/0246647 A1 | 11/2005 | Beam et al. | |
| 2005/0262091 A1* | 11/2005 | Marvin | G06F 8/36 |
| 2006/0005163 A1* | 1/2006 | Huesken | G06F 9/465 717/107 |
| 2007/0157088 A1* | 7/2007 | Lewis-Bowen | G06F 3/0482 715/700 |
| 2007/0245298 A1* | 10/2007 | Grabarnik | G06Q 10/06 717/104 |
| 2008/0114810 A1 | 5/2008 | Malek et al. | |
| 2009/0006154 A1 | 1/2009 | Hao et al. | |
| 2009/0006992 A1 | 1/2009 | Gilboa | |
| 2010/0121890 A1* | 5/2010 | Perkins | G06F 3/0482 707/805 |
| 2010/0229165 A1 | 9/2010 | Normington et al. | |
| 2011/0142053 A1 | 6/2011 | Van et al. | |
| 2011/0185315 A1 | 7/2011 | Armour et al. | |
| 2011/0218842 A1 | 9/2011 | Addala et al. | |
| 2012/0239825 A1 | 9/2012 | Xia et al. | |
| 2013/0239089 A1* | 9/2013 | Eksten | G06F 8/70 717/120 |
| 2014/0006923 A1 | 1/2014 | Barak et al. | |
| 2015/0212989 A1 | 7/2015 | Rice | |
| 2015/0339154 A1* | 11/2015 | Wen | G06F 9/46 718/102 |
| 2016/0150015 A1* | 5/2016 | Tenzer | H04L 67/1095 709/223 |
| 2016/0373275 A1 | 12/2016 | Al-Asaaed et al. | |
| 2017/0315789 A1 | 11/2017 | Lam et al. | |

* cited by examiner

BUNDLE.YAML FILE 1300

```yaml
---
bundleId: "vrcs.jenkins"
version: "1.0.0"
documentation: "https://wiki.vmware.com/tile/jenkins/1.0.0"
author: "VMware Inc."
datatypes:
  - "datatypes/JenkinsServer.yaml"
tiles:
  -
    tileId: "vrcs.jenkins:build_job"
    displayName: "Jenkins"
    schema: "schema/build_job.yaml"
    executor: "com.vmware.fms.tile.jenkins.BuildJobTile"
    executorType: "JAVA"
    views:
      -
        path: "/config.html"
        viewName: "config"
      -
        path: "/result.html"
        viewName: "result"
  -
    tileId: "vrcs.jenkins:get_jobs"
    schema: "schema/get_jobs.yaml"
    executorType: "JAVA"
    executor: "com.vmware.fms.tile.jenkins.GetJobsTile"
  -
    tileId: "vrcs.jenkins:get_job_parameters"
    schema: "schema/get_job_parameters.yaml"
    executorType: "JAVA"
    executor: "com.vmware.fms.tile.jenkins.GetJobParametersTile
```

FIG. 13

TILES IN REGISTRY 1400

```
{
 "tileId": "vrcs.jenkins:build_job",
 "displayName": "Jenkins",
 "bundle": {
  "id": "vrcs.jenkins",
  "version": "1.0.0",
  "author": "VMware Inc."
 },
 "schema": {
  "inputProperties": [
   {
    "name": "jenkinsServer",
    "type": "vrcs.jenkins:JenkinsServer"
   },
   {
    "name": "jobName",
    "type": "String"
   },
   {
    "name": "jobParameters",
    "type": "JSON"
   }
  ],
  "outputProperties": [
   {
    "name": "jobUrl",
    "type": "String"
   },
   {
    "name": "buildId",
    "type": "String"
   },
   {
    "name": "estimatedDuration",
    "type": "String"
   },
   {
    "name": "testResult",
    "type": "JSON"
   }
  ]
 },
```

FIG. 14A

TILES IN REGISTRY 1400

```
"executorType": "JAVA",
 "executor": "com.vmware.fms.tile.jenkins.BuildJobTile",
 "views": [
  {
   "viewName": "config",
   "viewUri": "http://tekton-be.eng.vmware.com:9000/fms/tile-ui/vrcs.jenkins/config.html",
   "viewUriPath": "/fms/tile-ui/vrcs.jenkins/config.html"
  },
  {
   "viewName": "result",
   "viewUri": "http://tekton-be.eng.vmware.com:9000/fms/tile-ui/vrcs.jenkins/result.html",
   "viewUriPath": "/fms/tile-ui/vrcs.jenkins/result.html"
  }
 ],
 "serviceUri": "http://tekton-be.eng.vmware.com:9000/fms/tile/vrcs.jenkins:build_job",
 "serviceUriPath": "/fms/tile/vrcs.jenkins:build_job",
 "linkedTiles": ["vrcs.jenkins:build_job"]
}
```

FIG. 14B

DATATYPES 1500

---
 name: "Machine"
 properties:
   -
   name: "hostname"
   type: "String"
   -
   name: "os"
   type: "String"
   -
   name: "addresses"
   type: "Address[]"
   -
   name: "memory"
   type: "Number"
   -
   name: "status"
   type: "Boolean"

---
 name: "Address"
 properties:
   -
   name: "ipv4"
   type: "String"
   -
   name: "ipv6"
   type: "String"

FIG. 15

RACK 1600

---
 rackId: "dev_app_machine"
 type: "Machine"
 data:
   hostname: "dev-app.eng.vmware.com"
   os: "Linux"
   addresses:
     -
       ipv4: "10.20.140.51"
   memory: "16"
   status: "True"

FIG. 16

INFORMATION-TECHNOLOGY WORKFLOW USING TILES THAT DECLARATIVELY SPECIFY DATATYPES

BACKGROUND

In the fast-paced world of Information Technology (IT), customers have come to expect timely updates of products (e.g., software products and services). Where annual updates were once considered satisfactory, quarterly and even monthly updates can provide a competitive advantage. Increasingly, product development is seen as a continuous workflow and not just as a series of discrete stages.

Workflow automation software, such as Code Stream, available from VMware Inc., can help shorten product development lifecycles by automating the different tasks needed to provision, deploy, test, monitor, and decommission the software targeted for a specific release. In addition, some workflow automation software can help ensure standardized configurations by coordinating the artifacts and process across each product development stage.

BRIEF DESCRIPTION OF THE DRAWINGS

FIG. 13 represents a bundle manifest file used when deploying a bundle of tiles.

FIGS. 14A and 14B show the representation of a tile in a tile registry.

FIG. 15 is a representation of a datatype definition.

FIG. 16 is a textual representation of a rack.

DETAILED DESCRIPTION

The present invention provides an extensible framework that supports arbitrary lifecycles for deployment and other forms of information-technology (IT) automation. The framework uses executable tiles as building blocks that can be arranged to implement a workflow. The tiles can be arranged so that they cooperate to define a workflow. Each tile includes executable code that, when executed, performs a respective operation of the tile. A tile may receive data from any previous tile in a workflow and provide results to a successor tile in the workflow. The workflow progresses as each tile performs its operation in turn.

The tiles can be reused to develop new workflows, so that new workflows do not need to be developed from scratch. For example, first and second tiles may be used together in a first workflow, while, a second workflow includes the first tile but not the second tile. In a sense, the tile framework facilitates the development and the delivery of workflow automation software much as workflow automation software facilitates the development and the delivery of other software.

Figure 1:
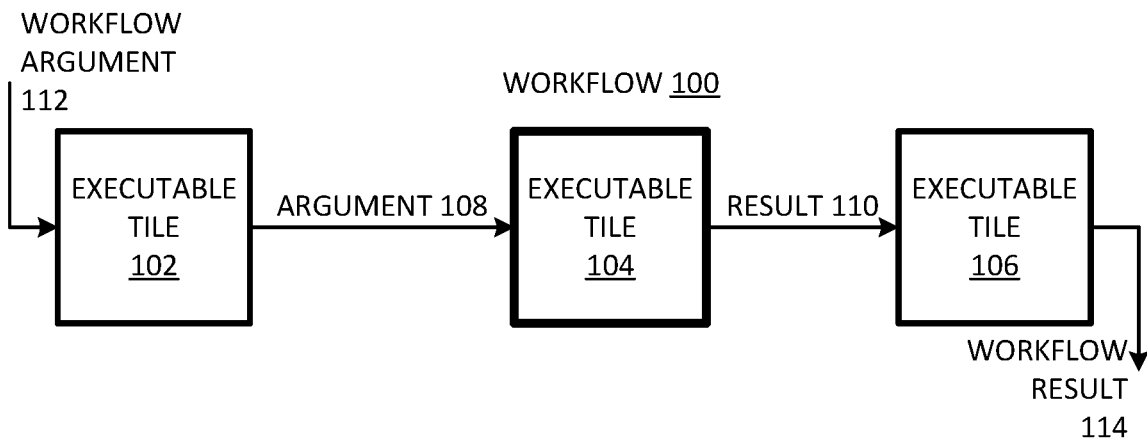
FIG. 1 is a schematic diagram of a workflow including executable tiles.

A simple workflow 100, shown in FIG. 1, is implemented using tiles 102, 104, and 106. Each tile accepts an input, and performs an operation on the input to yield a respective result. For example, executable tile 104 receives arguments 108, upon which tile 104 operates to yield results 110. Generally, for most complex workflows, most tiles receive arguments from respective preceding tiles and provide results that serve as inputs to respective succeeding tiles. Of course, for "start" tiles, for which there are no respective preceding tiles in the workflow, arguments, e.g., workflow argument 112, must be received from some other source. Likewise, for "end" tiles, for which there are no respective succeeding tiles in the workflow, the results, are workflow results, e.g., workflow result 1114.

A simple workflow 100, shown in FIG. 1, is implemented using tiles 102, 104, and 106. Each tile accepts an input, and performs an operation on the input to yield a respective result. For example, executable tile 104 receives arguments 108, upon which tile 104 operates to yield results 110. Generally, for most complex workflows, most tiles receive arguments from respective preceding tiles and provide results that serve as inputs to respective succeeding tiles. Of course, for "start" tiles, for which there are no respective preceding tiles in the workflow, arguments, e.g., workflow argument 112, must be receive from some other source. Likewise, for "end" tiles, for which there are no respective succeeding tiles in the workflow, the results, are workflow results, e.g., workflow result 114.

A "coder" assigned to automate a workflow can create the associated workflow automation software using tiles as building blocks, rather than working from scratch. Tiles can be individually updated; the updates can be substituted for earlier tile versions. New tiles can be developed and added to workflows. Such updates can be implemented without adversely affecting the rest of the workflow. The tiles need not be co-located, so they can be executed on different machines. The resulting distributed processing facilitates scaling out of the workflow.

Figure 2:
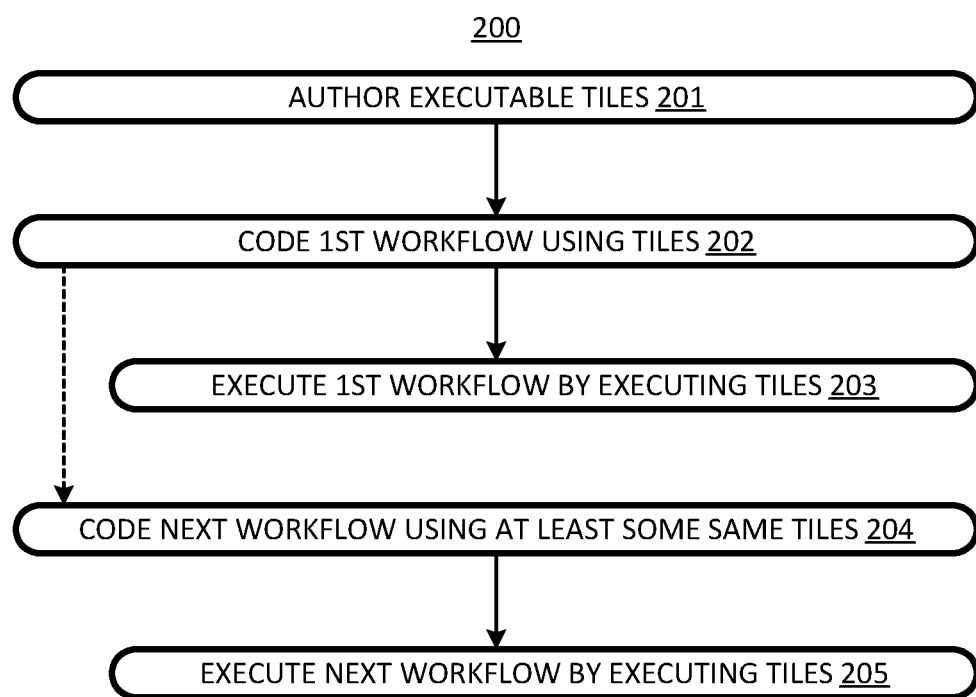
FIG. 2 is a flow chart of a process for creating and executing workflows including tiles.

Accordingly, a process 200, flow charted in FIG. 2, begins with authoring, e.g., by a tile author, executable tiles at 201. At 202, a first workflow can be coded, e.g., by a workflow coder, by arranging the tiles to execute in a particular logical order. At 203, the first workflow can be executed. At 204, a second or subsequent (next) workflow can be coded using at least some of the same tiles that were used to code the first workflow. This coding can be done before, during, or after execution of the first workflow at 203. The second/next workflow can be executed at 205.

In many cases, much of the functionality required by a workflow can be provided using existing (non-tile) software. In such cases, it may not be efficient or even possible to duplicate that functionality in a tile. For example, a cloud services vendor may require customers to use its own software in connection with its services. In such a case, a workflow can implement a tile that accesses the non-tile software to cause it to perform the desired function.

The non-tile software may favor or require a particular programming language, e.g., Java, JavaScript/NodeJS, Python, Go, Ruby, for programs (e.g., tiles) that access it. In fact, a workflow may interface with plural (non-tile) software products that require or favor different programming languages. Beneficially, the tiles in a workflow can be programmed in the same program language or different programming languages. Where the choice of programming language is not required by the non-tile software, the choice can be made according to the tile author's preference. This flexibility increases the availability of programmers that can author tiles.

Figure 3A:
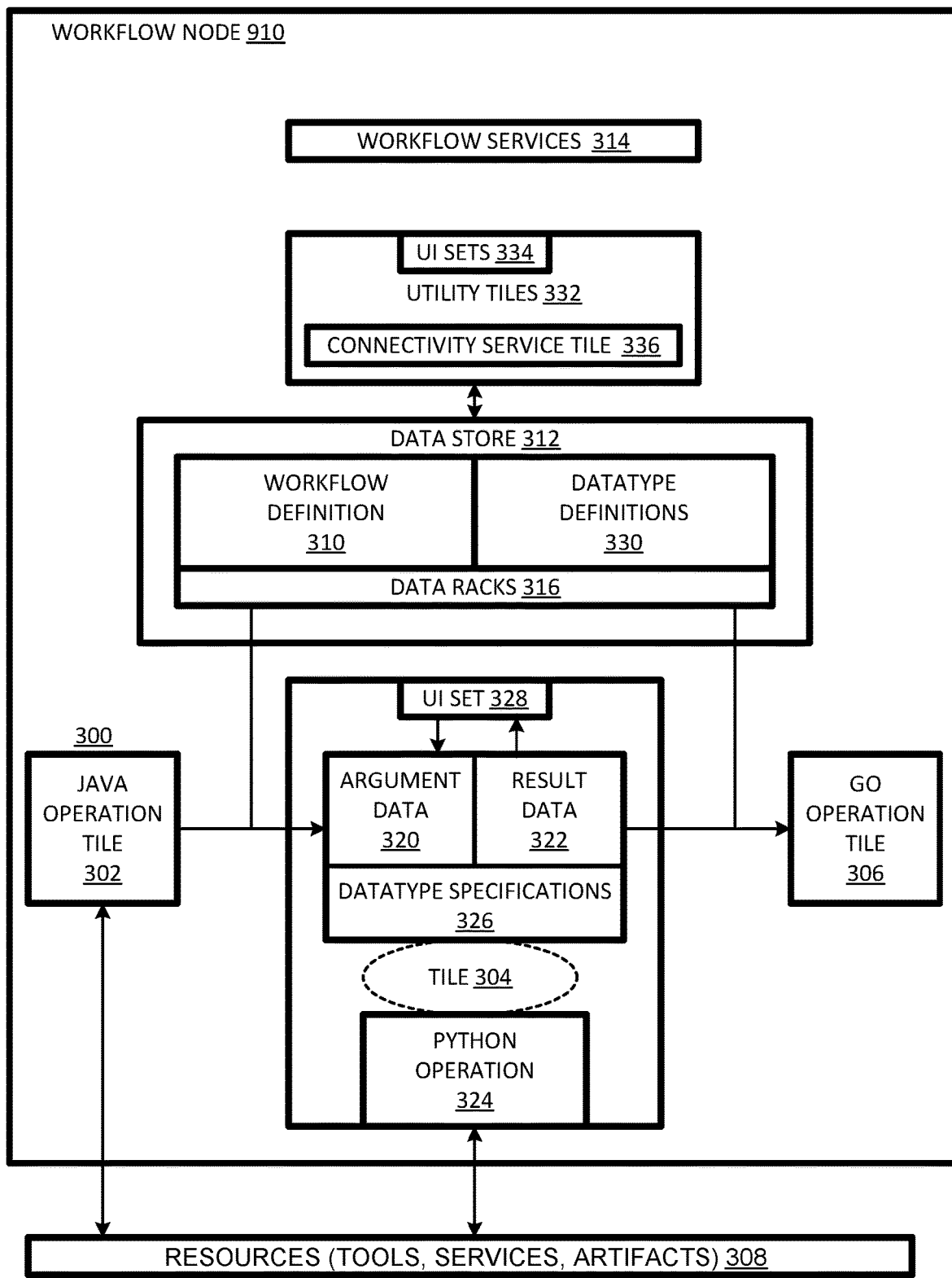
FIG. 3A is a schematic diagram of a workflow node including a workflow with tiles programmed in different programming languages.
Figure 3B:
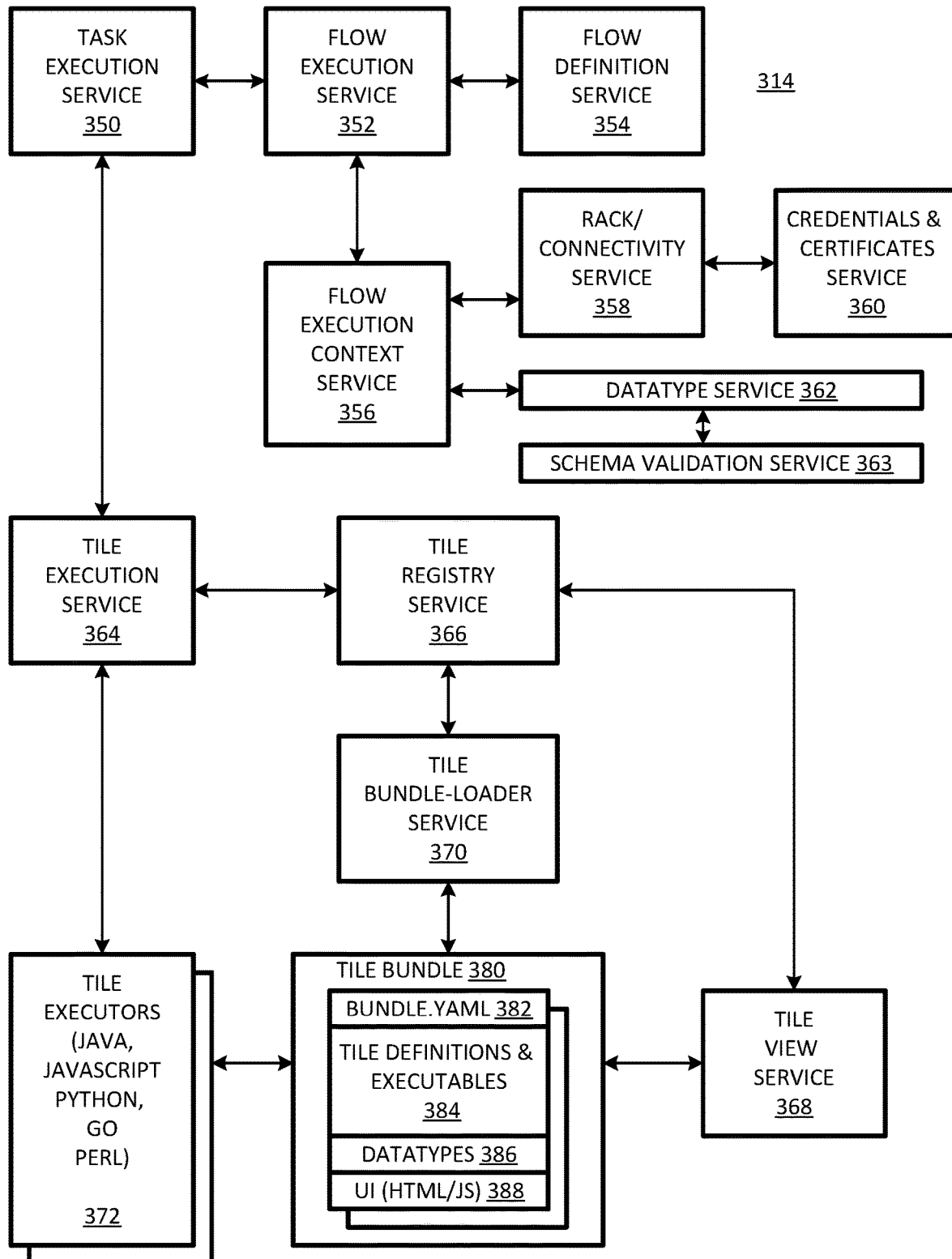
FIG. 3B is a detailed diagram of workflow services of FIG. 3A.

Thus in FIGS. 3A and 3B, a workflow 300 is implemented using tiles 302. 304, and 306. For example, tile 302 can be designed to configure a virtual network according to provided specifications, tile 304 can be designed to provision the virtual network, and tile 306 can be designed to report on the success or failure of the provisioning. By way of example, tile 302 can be designed so that its operation is programmed in the Java programming language to interface with a vendor's virtual-network design program. Tile 304 can be programmed in Python to interface with the vendor's virtual-network provisioning program. Tile 306 can be programmed in Go. As shown, tile 306 does not interface with any external resources. In general, all, some, or none of the tiles in a workflow may interface with respective external (to the workflow system) resources 308 such as tools, services, and artifacts (e.g., data objects created, modified, or deleted in the course of the workflow.)

The plugin framework abstracts the choice of language/platform with the functionality, and allows plugin authors to choose one or more languages to build a single plugin. The availability of a selection of programming languages provides flexibility and enables an efficient and robust system; in contrast, a single language sometime makes integration difficult. For example, vRealize Automation (aka, vRA), cloud automation products available from VMware, Inc. can have a Java-based software-development kit (SDK) and a DotNet-based IaaS (Infrastructure-As-A-Service) SDK, requiring a script to mash-up the data. The tile-based plugin framework also allows plugin authors to choose the most efficient and maintainable language for specific use-cases without compromising any freedom for native integrations.

Figure 4:
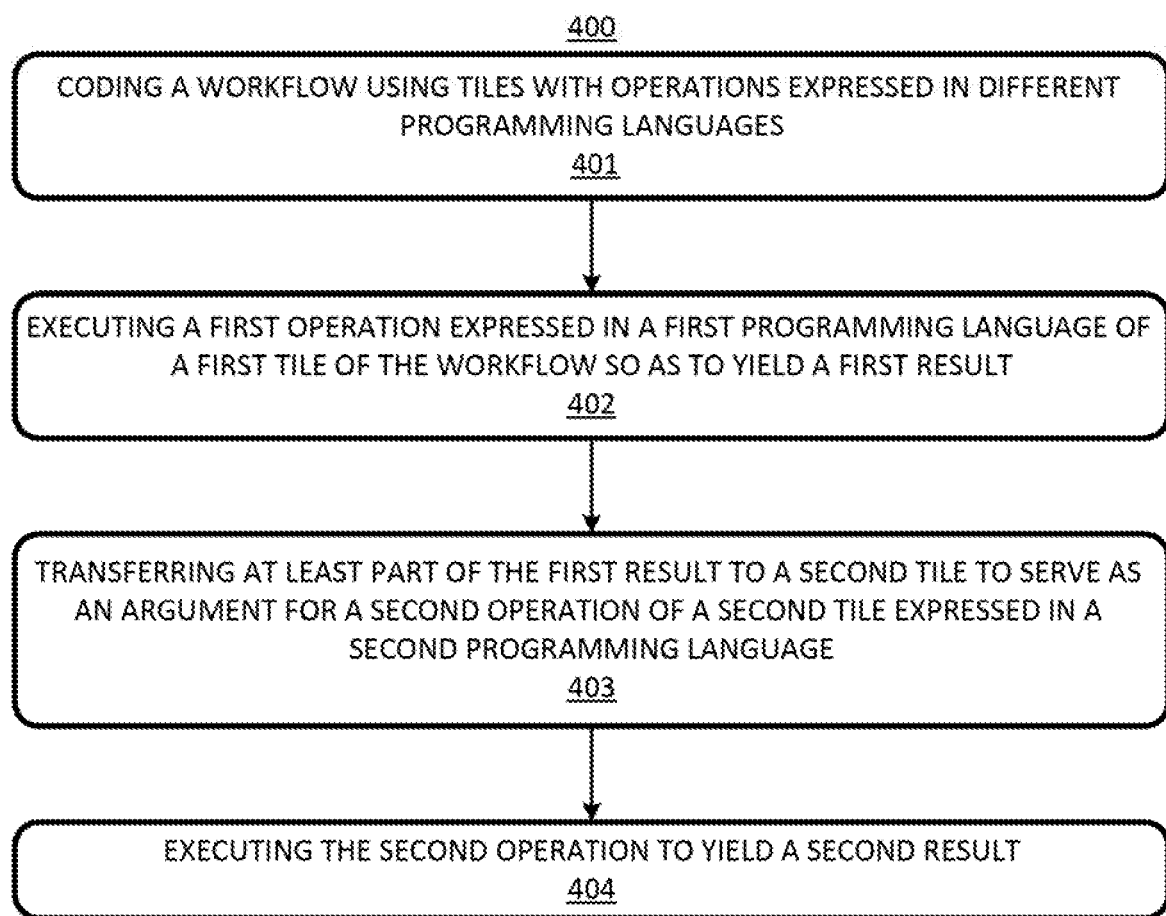
FIG. 4 is a flow chart of a process of executing a workflow including tiles with operations programmed in different programming languages.

Thus, in a process 400, flow charted in FIG. 4, operations coded in two different programming languages are executed in sequence. At 401, a workflow is coded using tiles with operations expressed in different programming languages. In other words, there is a pair of adjacent tiles with operations encoded in different programming languages.

At 402, the first tile, which immediately precedes the second tile in the workflow, is executed. Thus, the first operation, which is expressed in a first programming language, e.g., Java, is executed yielding a first result. At 403, at least part of the first result is transferred to the second tile to be used as an argument. In some scenarios, the entire result is transferred, in other scenarios, only part of the result is transferred to the second tile. In some scenarios, the whole or part that is transferred serves as the entire argument for the second operation of the second tile; in other scenarios, the whole or part result cooperates with other arguments to form the full set of arguments for a second operation of the second tile. At 404, the second tile operation is executed using the argument at least partially received from the first tile. The second operation of the second tile is expressed in a second programming language, e.g., Python, different from the first programming language. The execution of the second operation yields a second result. Actions 403 and 404 can be iterated in some embodiments.

A tile author may have certain tile neighbors in mind when creating a tile, in order to enhance flexibility. In an embodiment, tiles are installed in bundles of logically related operations. The tiles of a bundle may be written in different programming languages. Each tile can have a REST (Representational State Transfer) API (Application Program Interface) so that it can be used, tested, and verified independently of other tiles.

While a tile author may have certain tile groupings in mind, the tile framework provides for functionally connecting any tile to any other tile. The workflow coder must determine the tile arrangement and store information regarding the arrangement somewhere. In principal, tiles could be customized with such information, e.g., information identifying the preceding and succeeding tiles in the workflow. However, it is in general more useful to the workflow coder to have the arrangement information stored in one place, e.g., as a workflow definition 310 encoded in a datastore 312.

During workflow execution, workflow services 314 trigger tiles 302, 304, and 306 (in the illustrated left-to-right order) as specified in workflow definition 310. Workflow services 314 encompasses a number of services including a task execution service 350, a flow execution service 352, a flow definition service 354, a flow execution context service 356, a rack or connectivity service 358, a credential and certificates service 360, a datatype service 362, a tile execution service 364, a registry service 366, a tile view service 368, and a tile bundle loader service 370, and a tile execution service 372.

Tile bundle-loader service 370 installs bundles 380 including one or more tiles. Each bundle includes a bundle manifest 382, expressed as a bundle.yaml file. The bundle 380 includes tile definitions and executables 384, data specifications 386, and user interfaces expressed in HTML/JS. YAML stands for "yet another markup language"; HTML stands for "hypertext markup language" and JS stands for JavaScript. The tile view service 368 provides user access to respective user interfaces 388. The tile executors provide the execution mechanism required for executing the tile operations. In other words, an embodiment of a tile executor may create a container/virtual machine.

In the bundle file structure, the executables (operations), the datatypes, and the user interfaces are arranged in separate folders. In other words, one folder includes the executables, one folder includes the datatype specifications, and another folder contains the user interfaces. However, relations between the tiles, datatypes, and user interfaces are specified in the tile manifest 384, thus defining for each tile its associated executables, datatypes, and user interfaces.

Workflow definition 310 (FIG. 3A) not only specifies the way the workflow tiles are arranged, but also what data is to be transferred between adjacent tiles. Typically, a tile can ingest argument data sourced from a predecessor tile. For example, tile 304 ingests argument data 320 from results of tile 302. Also, result data 322 of tile 304 can be provided for use as argument data to tile 306. In general, a tile receives its argument data from other tiles, data racks 316, and its user interface(s). Not the results of a tile are needed by its successor in the workflow. In general, the argument for a tile will include some but not necessarily all of the results from a preceding tile, data from racks 316, and, in some cases, data from the respective user interface set.

In some embodiments, a workflow coder specifies data to be transferred by specifying data read and write addresses. However, in the illustrated embodiment, the coder can define data flow in terms of datatypes. Herein, a "datatype" is a data structure having a name and including one or more properties, which can also be other datatypes, each of which has a name, a data format (e.g., text string or integer), and memory space for storing data in the data format. Datatypes can be expressed in a JSON format or another format. Examples of datatypes can include machine, artifacts, and test results. Tiles can include a declarative specification of datatype or types to define what the tile expects and what it will produce. Herein, a "rack" is an instance of a datatype that can be unpopulated, partially populated, or completely populated by data. Thus, a workflow coder can specify data flow in terms of racks and schema.

Figure 5:
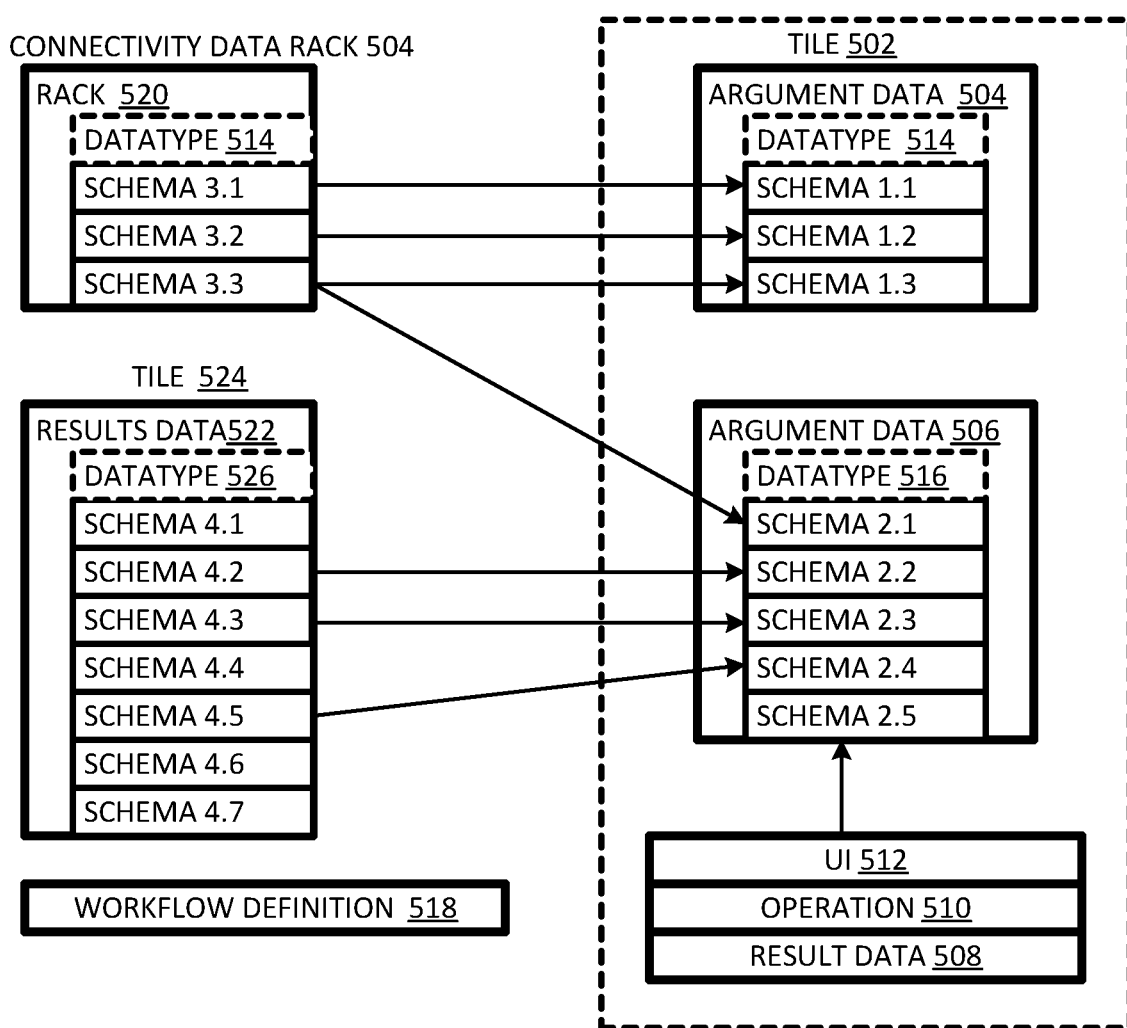
FIG. 5 is a schematic diagram of transferring data for use as arguments by a tile operation.

Data transfers can be complex. For example, as shown in FIG. 5, a tile 502 includes argument data 504 and 506, result data 508, an operation 510, and a user interface (UI) 512. Tile 504 specifies a datatype 514 for argument data 504 and a datatype 516 for argument data 506. As per datatype 514, argument data 504 includes three properties, which are labeled schema 1.1, 1.2, and 1.3 in FIG. 5. As per datatype 516, argument data 506 includes five schema, which are labeled 2.1, 2.2, 2.3, 2.4, and 2.5.

A workflow definition 518 specifies that argument data 504 is to be populated from a rack 520, for which datatype 514 is specified; in other words, argument data 504 and rack 520 are instances of the same datatype. Transferring data between a source and a target of the same datatype is often straightforward. In this case, the contents (data) of properties 3.1, 3.2, and 3.3 of rack 520 are to be respectively transferred to properties 1.1, 1.2, and 1.3 of argument data 504. The data transfers are effected, not by copying and moving data, but by specifying property bindings.

Workflow definition 518 specifies a more complex data transfer for an argument data 506, which is to be partially populated from results data 522 of tile 524, which is the predecessor of tile 502 in the respective workflow. Results data 522 has a datatype 526. In accordance with datatype 526, results data 522 has seven properties 4.1, 4.2, 4.3, 4.4, 4.5, 4.6, and 4.7. Workflow definition 518 calls for transferring the contents of properties 4.2, 4.3, and 4.5, to properties 2.2, 2.3, and 2.4 of argument data 506. However, properties 2.1 and 2.5 are not filled from results data 522. Instead, property 2.1 is property bound to property 3.3 of rack 520 and property 2.5 is filled using user interface 512 of tile 502.

Workflow services 314, FIG. 3A, can make use of datatype services 362 to look up each datatype in datatype definitions 330 in datastore 312 and determine the constituent properties of the datatype. This allows the workflow coder and, thus, workflow definition 310 to express data flow in the meaningful terms of datatypes, properties, tiles and racks instead of terms less related to the workflow itself, e.g., in terms of storage addresses.

A declarative model defines custom datatypes and instances that can be used to define schema for plugins and also offers a schema-based property bag. This allows the instances of the datatypes to be used in different scenarios viz. endpoints, object instances, property bags and many other use-cases.

There are three main constructs. 1) DataType: A container for a group of related properties that can be identified as an object/type viz. Machine, Artifact, JenkinsServer. 2) Schema: This is the main content which define the members of a type viz. Datatype "Machine" has host name, an IP address, memory, storage, operating system, etc.; and 3) Racks: Instances of datatypes that contain the values as per the schema. DataType is registered using a datatype service 362 that accepts the unique name of the type and members/schema for the type which is validated by a schema validation service 363 for unique namespace and contract.

A datatype can be used as part of the tile schema. A rack is used to represent to endpoints, i.e., external resources, such as "JenkinsServer", "ArtifactoryServer", "vRAHost", etc. Racks can be used as pre-configured machines, artifacts, servers etc. Datatypes can be used to associate views and actions. This will allow the extensibility aspect of various deployment automation products such as vRealize Code Stream to provide functionality in troubleshooting views to allow users perform actions on machines such as Reboot, Power-Off and connect using SSH. Datatypes can be used with tiles to define the life-cycle for racks and allow hooks for pre-create, pre-update, pre-delete using lifecycles.

Figure 6:
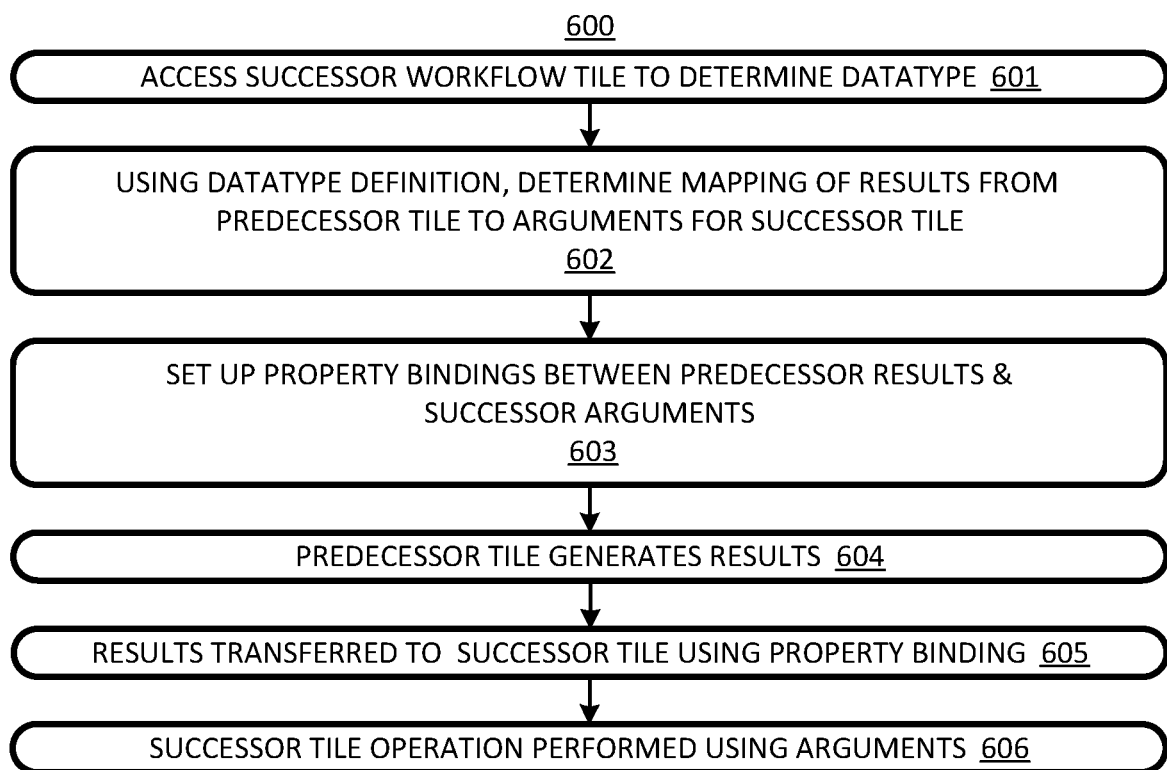
FIG. 6 is a flow chart of a process of data transfers between tiles.

Thus, a process 600, flow charted in FIG. 6, begins at 601 with accessing a "successor" tile to determine its results' datatype from its schema. At 602, using a definition of the datatype, determining a mapping of results (to be determined) from the (immediate) predecessor tile to arguments for the successor tiles. At 603, property bindings are set up binding the arguments to the results. At 604, the predecessor tile generates results. At 605, the results are "transferred" to the successor tile using property binding. At 606, an operation of the successor tile is performed yielding results that are, at least in part, a function of the results of the predecessor tile.

As noted above, not all the data needed as arguments for a tile operation need come from workflow results. For example, data required by tile 304, FIG. 3A, can be provided via a user interface set 328, which includes at least one user interface that can be used to provide data either during runtime or prior to runtime. Data entry during runtime is disfavored since it can interfere with the degree of automation desired. Pre-runtime data entry can be burdensome if performed tile by tile through their respective user interfaces. A more efficient approach to pre-runtime data entry is to enter data directly into racks 316 via a common interface. Such an interface can be provided using one or more user interfaces associated with utility tiles 332, each of which can have its own user-interface set 334. Thus, one can distinguish workflow tiles that are arranged in a workflow and utility tiles that are not part of the workflow per se but contribute to the workflow in some auxiliary manner.

For example, tile 304 of FIG. 3A may be designed to provision a virtual machine specified by the results of tile 302. To access a tool for provisioning a virtual machine, tile 304 may need to know the tool location, a user name, and an associated credential. Such "connectivity information" would not be built into the tile or be included in the result of another workflow tile. So the workflow coder could use a connectivity services utility tile 336 and enter connectivity information for all tiles that need such information directly into associated racks or other data structures within data store 312.

Each workflow or utility tile can have a user-interface set. A user-interface set can have zero, one, or plural user interfaces. A user interface for a tile can allow, for example, editing of a tile, customization of a tile, data entry to a tile, progress tracking of a tile operation, access to tile results, trouble shooting and debugging. The user interfaces can provide one or more views to represent various characteristics of the tile viz. configuration screen, execution screen, result screen, log screen etc.

In practice, user interfaces are programmed in JavaScript. For tiles with more than one user interface, all user interfaces can be programmed using the same UI framework or different UI frameworks for at least two of the user interfaces. UI frameworks can include JQuery, Bootstrap, Reactive, AngularJS, etc. The user interface files can be hosted as browser-accessible URL (Uniform Resource Locations).

Tiles have their own lifecycles, e.g., authoring, testing, release, installation into a workflow system, arrangement into a workflow, execution, debugging, and decommissioning. Having multiple user interfaces allows user interfaces tailored for each lifecycle stage. Within a lifecycle stage, simple and complex user interfaces can be provided for users with different levels of sophistication. In some cases, a user may be given a selection of user interfaces to choose from; in other cases, the tile itself, e.g., a user authentication program, may select the user interface appropriate for a user.

Figure 7A:
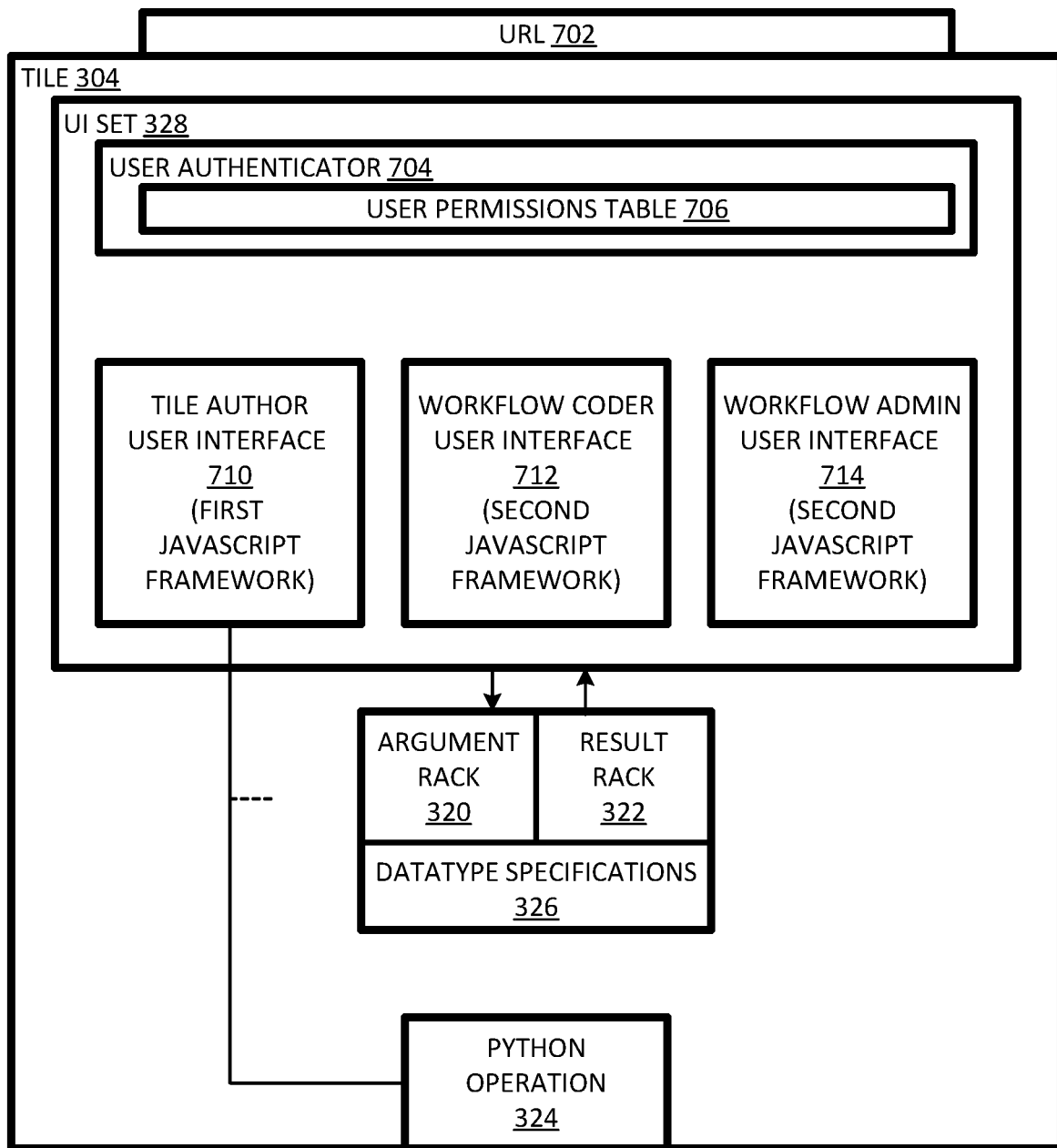
FIG. 7A is a schematic diagram of a tile of FIG. 3A showing its user interfaces.

As shown in FIG. 7, tile 304 is attached to a URL (Uniform Resource Locator) 702. A user accessing tile 304 via URL 702 is handled by user authenticator 704, which is designed to determine and verify the identity of those accessing tile 304. Authenticator 704 includes user permissions 706, which is a table that associates user identifications with roles and permissions.

For example, one user may be associated with a tile-author role that has permission to edit the tile operation and metadata; such a user might be presented with tile author user interface 710. Another user might be a person with responsibility for coding a workflow; such a user might be presented with a workflow coder user interface 712. A further user may be associated with a workflow administrative role that has access for monitoring progress of a tile operation; such a user might be presented with workflow administrator user interface 714. Other user interfaces can be made for users having other roles. User authenticator 704 selects a user interface as a function of the permissions assigned to a user accessing tile 304. While, in FIG. 7, user authenticator 704 is shown within tile 304, in practice user authentication is performed outside of the workflow, with the user permission being used to allow/prevent access to user interfaces and other aspects of the workflow.

Alternatively a user interface may be selected based on the lifecycle stage of a tile. For example, one user interface may be selected while a tile is in development; another may be selected after a tile is installed but before it is integrated into a workflow, while another user interface may be selected while the tile is in integrated into a workflow. In other cases, users may be able to select a user interface from a list of available user interfaces.

Figure 7B:
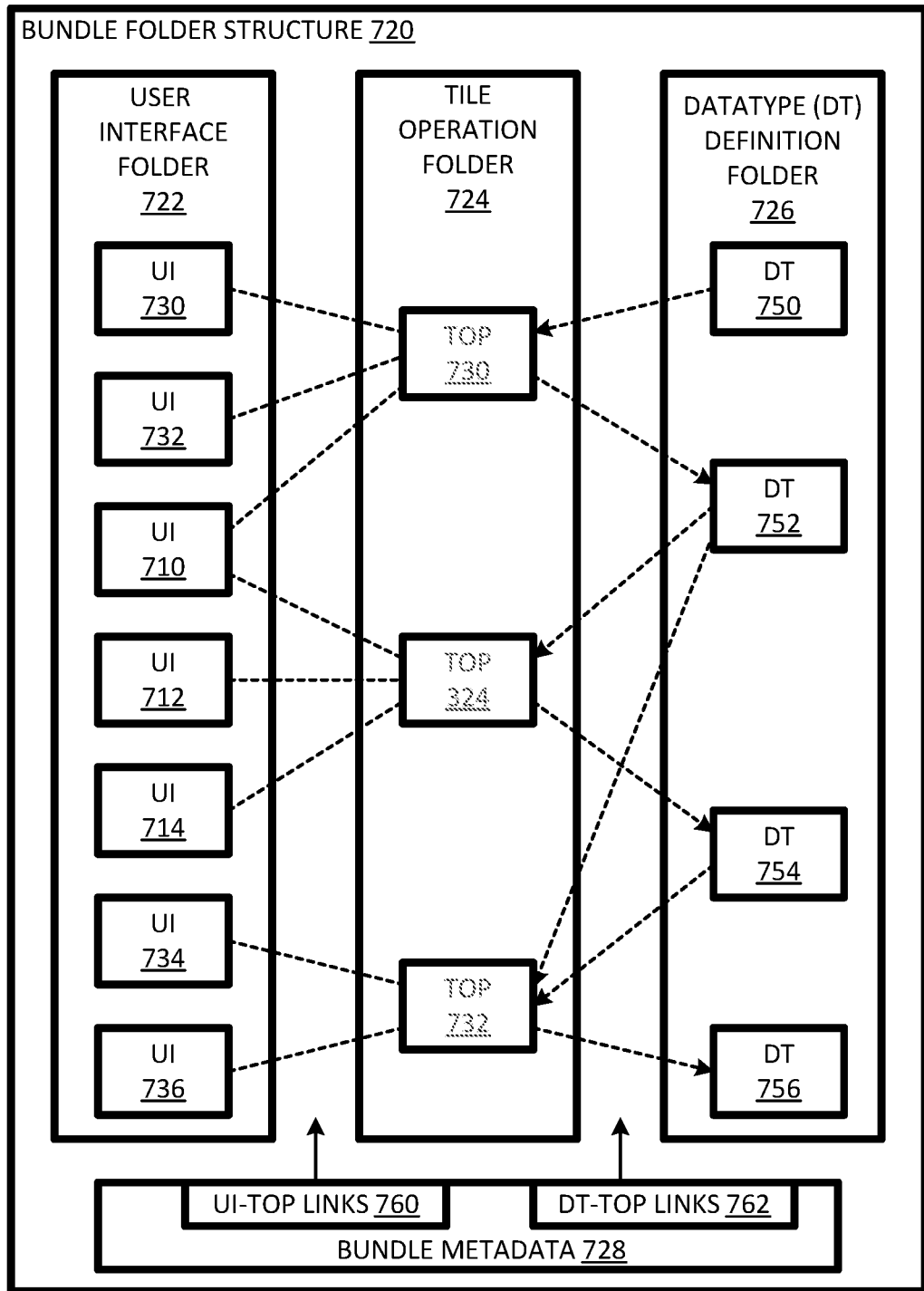
FIG. 7B is a schematic diagram of a bundle folder structure that facilitates the use of multiple user interfaces per tile.

To facilitate the use of multiple user interfaces for a tile, one aspect of the invention provides a bundle folder structure 720, as shown in FIG. 7B, including a user interface (UI) folder 722, an tile operation (TOP) folder 724, a datatype (DT) folder 726, and bundle metadata 728. User interface folder 722 includes files defining user interfaces 710, 712, and 714 of FIG. 7A, as well as additional user interfaces 730, 732, 734, and 736. Tile operations folder 724 includes tile operation executables including python operation 324 of tile 304 (shown in FIGS. 3A and 7A) as well as tile operation executables 740 and 742, associated with tiles 302 and 306 of FIGS. 3A and 7A. Datatype (DT) definition folder 726 includes datatype definitions 750, 752, 754, and 756.

Bundle metadata 728 includes assignments (i.e., "links") of user interfaces to tile operations. In other words, the user interfaces are not integrated with the tile operations, but merely associated via metadata 728. Thus, it is easy to assign in metadata 728 multiple user interfaces to tile operations, as shown by the dotted lines to TOP 724 from user interfaces 710, 712, and 714. Also, one user face, e.g., UI 710, can be assigned to more than one tile operation, e.g., TOP 730 and TOP 324. This arrangement also facilitates the reuse of user interface code in other bundles.

Similarly, bundle metadata 728 includes assignments (links) between datatype definitions and tile operations, as shown by arrows (representing argument schema) into and by arrows (indicating result schema) out of TOPs 730, 324, and 732. Again, a datatype can be used by more than one tile operation, and a single tile operation can have one or more argument datatypes and one or more result datatypes. Also, datatype definitions can easily be used in other bundles. Note that all components of a bundle are installed together. A workflow need not use all tiles in a bundle, and a workflow can include tiles from one or more bundles.

Figure 8:
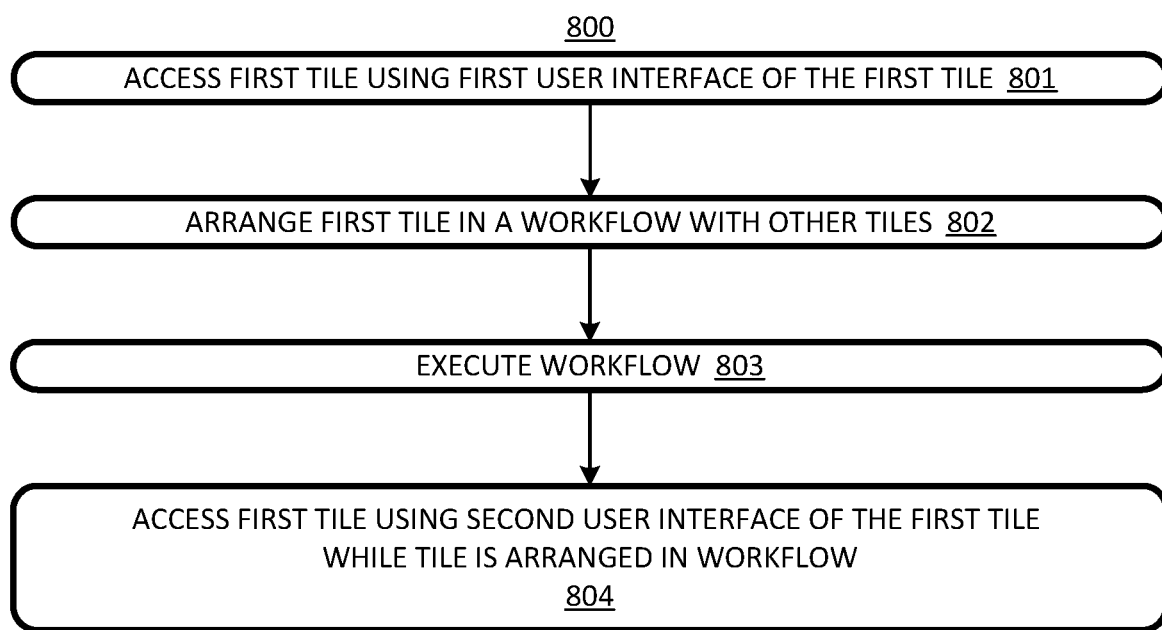
FIG. 8 is a flow chart of a process of accessing a tile via its user interfaces.

A process 800, flow charted in FIG. 8, begins with a user accessing, at 801, a first tile via a first user interface of the first tile. Depending on the scenario, the first tile may or may not be arranged in a workflow during the access at 801. At 802, if the first tile was not arranged in a workflow at 801, it can be arranged in a workflow at 802. Alternatively, arranging action 802 can be implemented before action 801. At 803, the workflow is executed after the arranging at 802. The execution may occur before or after the execution, depending on the scenario.

At 804, a user, typically a different user than the user of 801, accesses the first tile using a second user interface of the first tile. This access can occur before or after action 802, before or after action 803, and before, during, or after action 803. Depending on the embodiment, the second user interface can be based on the same UI framework as the first user interface. Alternatively, the user interfaces can be based on different UI frameworks. Process 800 can be extended, e.g., to include three or more users accessing the first tile using three or more respective user interfaces, wherein the user interfaces can be based on any combination of UI frameworks.

Figure 9:
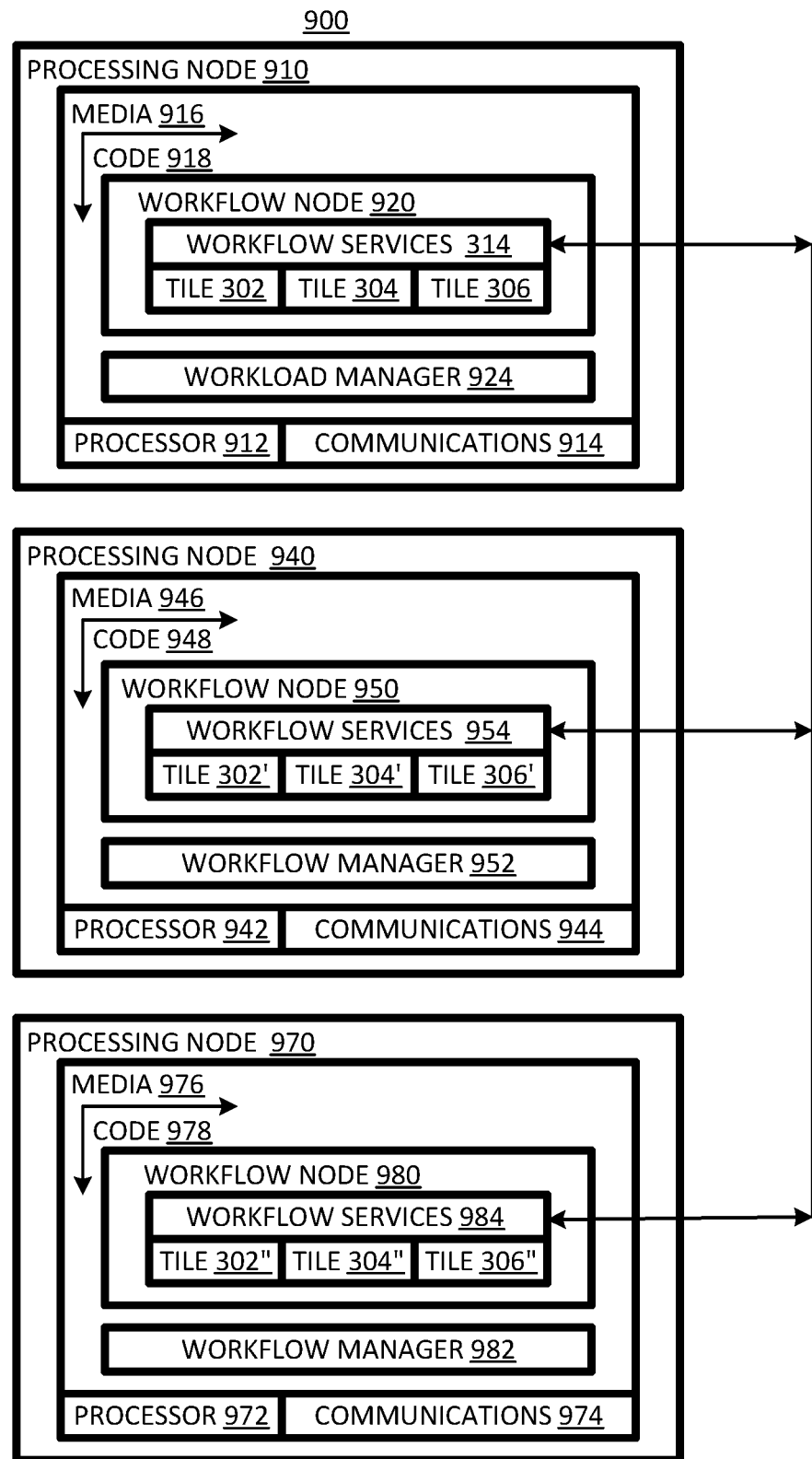
FIG. 9 is a schematic diagram of a workflow system with plural processing nodes having plural respective workflow nodes.

One of the advantages of using tiles is that the processing involved in their execution can be distributed. If several workflows are being executed concurrently and one processing node becomes overloaded, some tiles can be executed elsewhere to relieve the processing load. For example, workflow system 900, shown in FIG. 9, includes processing nodes 910, 940, and 970. Processing node 910, includes a processor 912, communications devices 914, and non-transitory media 916. Media 916 is encoded with code 918 defining workflow node 920, workflow services 314, tiles 302, 304, and 306, and workload manager 924.

Processing nodes 940 and 970 are similar to processing node 910. Processing node 940 includes a processor 942, communications devices 944, and non-transitory media 946. Media 946 is encoded with code 948 defining a workflow node 950 and a workload manager 952. Workflow node 950 includes workflow services 954 and tiles 302', 304', and 306'. Processing node 970 includes a processor 972, communications devices 974, and non-transitory media 976. Media 976 is encoded with code 978 defining a workflow node 980 and a workload manager 982. Workflow node 980 includes workflow services 984 and tiles 302", 304", and 306".

Processors 912, 942, and 944 execute respective code 918, 948, and 978 to achieve the respective functionality for workflow nodes 920, 950, and 980. Workflow managers 912, 952, and 982, monitor utilization of processors 918, 948, and 978, communications devices 914, 944, and 974, and media 916, 946, and 976 to indicate when a workload should be shifted from one processing node to another. These workload shifts are communicated to respective workflow services 924, 954, and 984.

Workflow services 924, 954, and 984 communicate via communications devices 914, 944, and 97u4, among each other, so that when one tile completes its operation, a counterpart of its successor can begin its operation on another processing node. For example, if workload manager 924 signals, while tile 302 is executing, to workflow services 314 that the current workload on processor node 910 should be reduced, workflow services 314, 954, and 984 can cooperate to determine that tile 304' should be executed next in the sequence. In that case, the results of tile 302 can be copied to workflow node 950 for use by tile 304'. Since workflow services 314, 954, and 984 are distributed as opposed to the same function being centralized, the number of workflows or workflow instances that can be handled concurrently can be readily scaled out.

Figure 10:
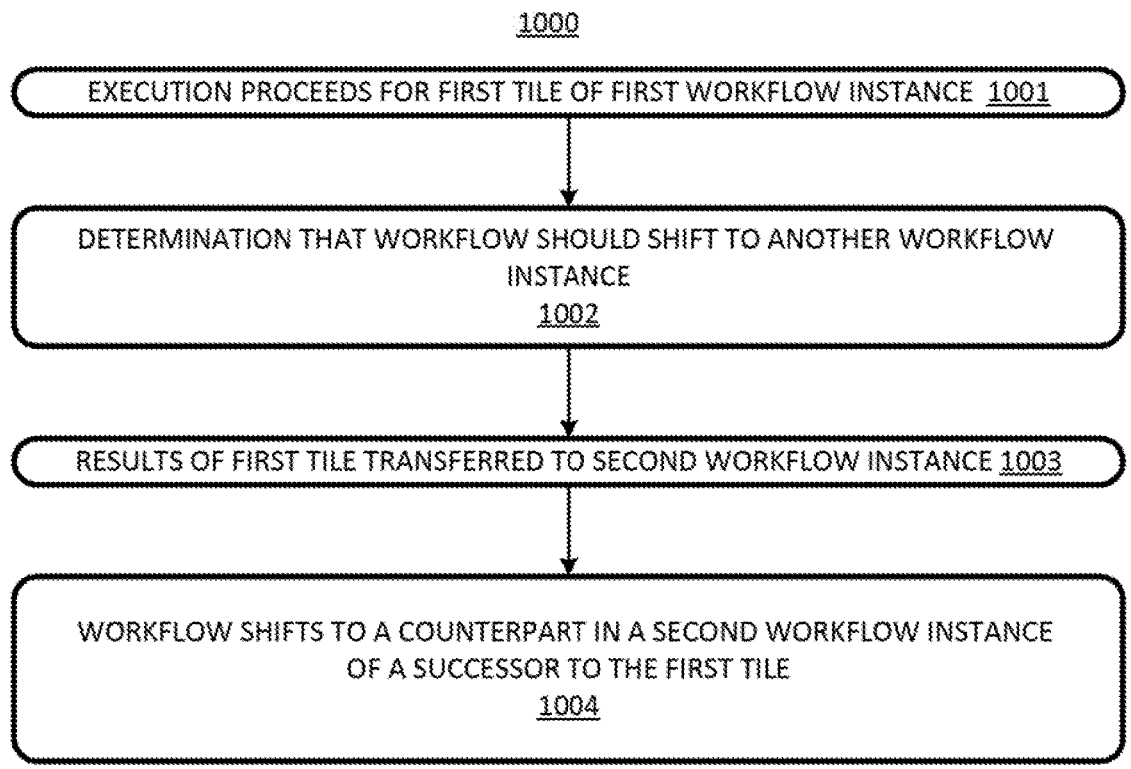
FIG. 10 is a process for transferring execution of a tile from one workflow instance to another.

A multi-node workflow process 1000 is flow-charted in FIG. 10. At 1001, execution of a first tile of a first instance of a workflow on a first processing node proceeds. At 1002, a determination is made that workload execution should be shifted to another instance of the workflow. Action 1002 can occur during processing of the first tile or before, e.g., a shift can be scheduled based on predicted utilization based on trends or historical patterns. At 1003, upon completion of the first tile operation, results of the first tile are transferred to a second instance of the workflow. At 1004, execution of a counterpart of a successor to the first tile can begin on the second instance of the workflow.

While FIGS. 3 and 5 depict linear workflows, tiles can be used to build a workflow with branches and, in some embodiments, loops. For example, workflow 1100 includes a calculate tile 1102 that performs some calculation. Tile 1102 is followed by a validation tile 1104, which validates the result of calculate tile 1102. In cases where the result is validated, workflow 1100 proceeds to a first-branch tile 1106 which begins a first branch. In cases where the validation fails, workflow 1100 proceeds to tile 1108, which begins a second branch, e.g., a cleanup and retry branch. Alternatives to defining branches in workflow definitions include building an alert into each tile or each validation tile, and building an alert system into the workflow itself.

Figure 11:
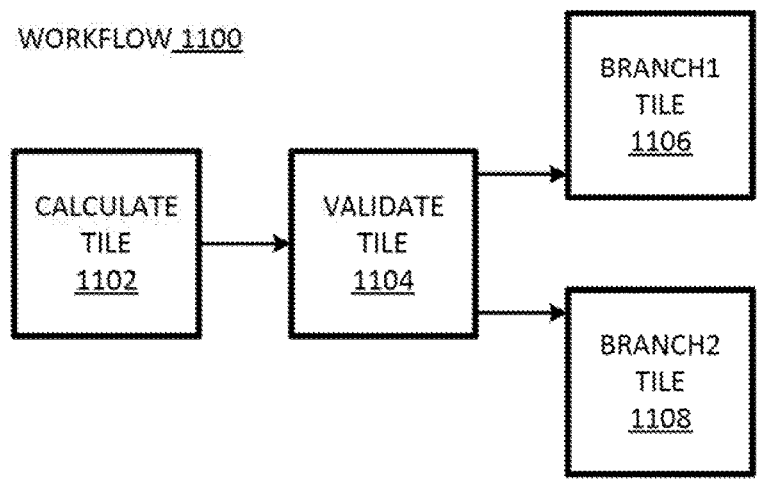
FIG. 11 is a schematic diagram of a workflow with branches.

While tiles are typically executed in workflow order, some workflow definitions implement speculative out-of-order processing. For example, in FIG. 11, branch tile 1106 can begin operating on the results of tile 1102 and make progress while 1104 performs its validation. In the event the validation is successful, the results of tile 1106 can be used; in the case that validation is unsuccessful the results of tile 1106 can be dropped and the workflow can progress to branch tile 1108. In other cases, two or more branches can be executed speculatively while the branch root tile (e.g., tile 1104) executes. Depending on the branch-root result, one branch will be retained and the other dropped. Note that the branch tiles can be executed on different workflow nodes and different processing notes to avoid utilization bottlenecks.

Figure 12:
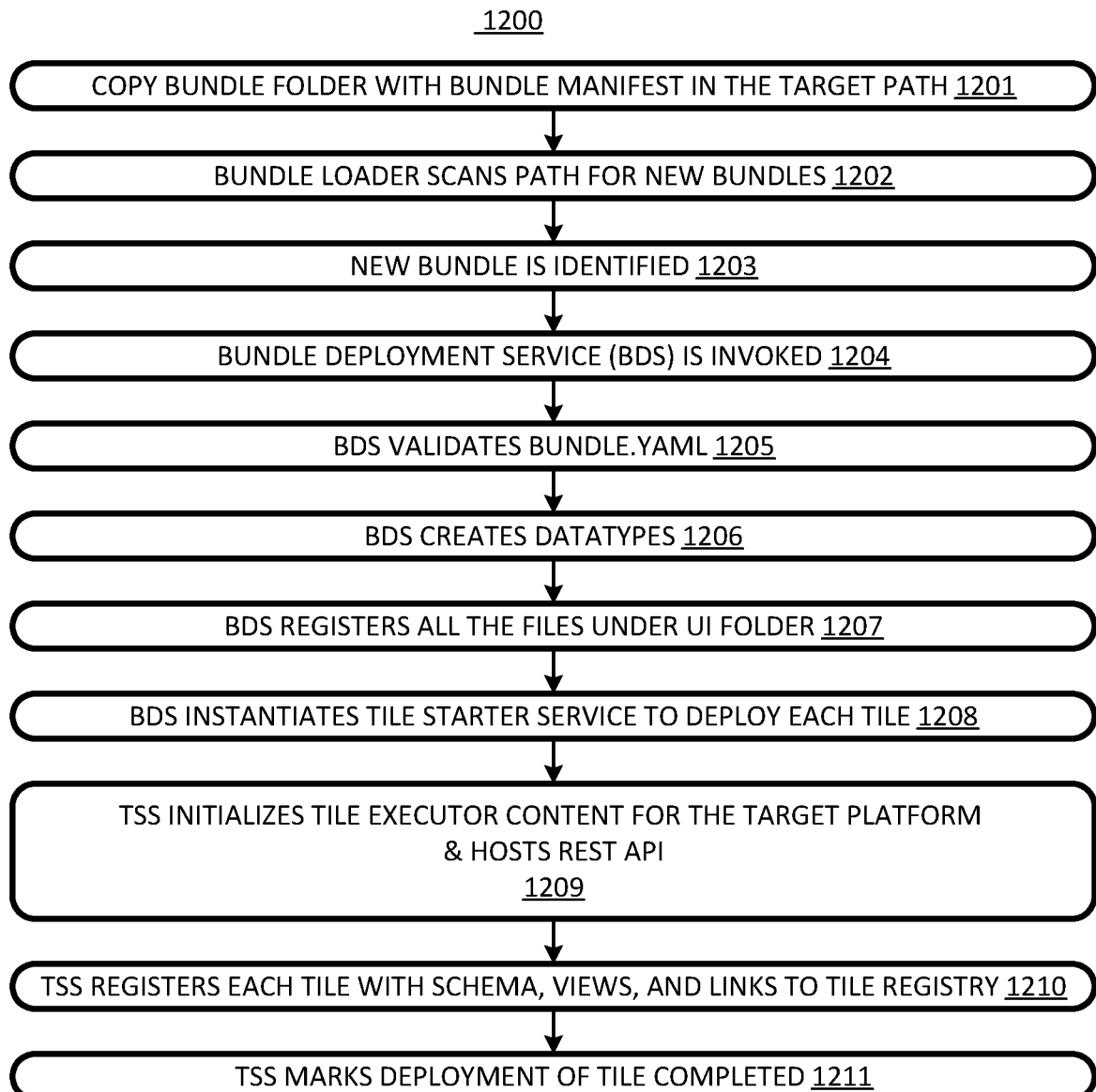
FIG. 12 is a flow chart of a bundle deployment process.

A bundle deployment process 1200 is flow charted in FIG. 12. At 1201, a bundle folder is copied with a bundle manifest to a target path. An example of a bundle manifest, e.g., bundle.yaml file 1300, is shown in FIG. 13. At 1202, a bundle loader scans target path for new bundles. At 1203, the new bundle is identified by the scan.

At 1204, a bundle deployment service (BDS) is invoked. At 1205, the BDS validates the bundle manifest. At 1206, the BDS creates datatypes. At 1207, the BDS registers all the files under the user-interface folder. At 1208, the BDS instantiates a tile starter service (TSS) to deploy each tile.

At 1209, the TSS initializes tile executor content for the target platform (e.g., Java, JavaScript, and Python) and hosts a REST API. At 1210, the TSS registers each tile with schema, views, and links to the tile registry. An example of tiles in registry 1400 is presented in FIGS. 14A and 14B. At 1211, the TSS marks deployment of each tile completed.

Herein, "tile" refers to a linkable executable software object that performs an operation on argument data to yield result data. The operation can involve interaction with external resources; for example, the operation may create, modify, and/or delete a virtual machine. "Linkable" refers to the ability of a tile to form linear or other arrangements so as to define a workflow. When arranged in a workflow, tiles are executable in a prescribed logical order, and results of a tile operation serve as at least some of the arguments to the next tile in the order. (This does not preclude executing tiles in an order other than the logical order, as long as the non-logical order achieves an equivalent result.) To this end, data is transferred between tiles, typically by storing results in a rack and using property binding to the rack to define arguments. A tile has a lifecycle that may include its creation, its validation, its inclusion in a workflow, and its deletion, e.g., in the context of the workflow.

Herein, a programming language is a language used to design a computer-executable tile or other object, Java, JavaScript, Python, and Perl are examples of programming languages that can be used for programming tile operations. User interfaces for tiles are typically programmed in JavaScript; different UT frameworks can be used for different interfaces.

Herein, a "schema" is a data structure for storing a collection of items of data in a predetermined basic format. Basic formats include "integer", "text string", etc. Herein, a "datatype" is a data structure that has a name and a schema. Tiles declaratively specify argument and result datatypes, typically by identifying a datatype name. Datatype definitions typically list the included schema by name and data format. Herein, a "data rack" is a data structure that is an instance of a datatype. A data rack may be completely or partially populated with data or unpopulated. Datatype definitions 1500 are illustrated in FIG. 15; a rack definition 1600 is presented in FIG. 16.

Herein, a "processor node" is a system having at least one processor, media, and communications devices. The media is used to store instructions and data. The processor modifies data based on the instructions. The communications devices transfer data, e.g., among processor nodes. Herein, a "workflow node" is a workflow instance on a processor node. In some embodiments, workflow nodes can communicate with each other to shift a workflow between workflow instances.

Workflow shifts can be in response to workload management data. For example, if utilization data indicates that a use of a processor node is causing a bottleneck, some of the load can be shifted to another processor node by transitioning from one workflow instance to another on another processor node. Similarly, performance data, such as transaction latencies, may call for a workflow shift between processor nodes.

The plugin framework has been built around a registry specification to allow a contract-based tile-registry. This is how it makes the functionality agonistic to the platform. Each tile registers the HTTP accessible URL, schema and meta-data about views and linked tiles. The registry provides an abstraction between various implementations and allows tile authors to submit different sets of functionality by using published tiles in registry. The registry contract also offers to register data-types that can be used as part of the schema. The framework offers simple packaging and deployment of the bundles in the runtime server and registers automatically to the tile-registry.

A process 1200 for deploying a bundle is flow charted in FIG. 12. At 1201, a folder of files for a tile bundle is copied with bundle.yaml in a target path. YAML (Yet Another Markup Language) is a human-readable data serialization language that takes concepts from programming languages such as C, Perl, and Python, and ideas from XML and the data format of electronic mail (RFC 2822). The folder can includes files for tiles, files for datatypes, and files for user interfaces. At 1202, a bundle loader scans the path for new bundles. At 1203, the new bundle is identified.

At 1204, a bundle deployment service (BDS) is invoked. At 1205, the BDS validates the bundle.yaml file. An example of a bundle.yaml file 1300 is shown in FIG. 13. At 1206, the BDS creates the datatypes listed in the bundle.yaml. This can include listing the datatype definitions and creating racks corresponding to the datatypes. At 1207, the BDS registers all the files under a user-interface folder.

At 1208, BDS instantiates a tile starter service (TSS) to deploy each tile. At 1209, TSS initializes tile executor content for the target platform and hosts a respective REST API. At 1210, the TSS registers each tile with schema, views, and links to tile registry, as shown at 1400 in FIGS. 14A and 14B. At 1211, the TSS marks deployment of tile completed.

Herein, art labelled "prior art, if any," is admitted prior art; art not labelled "prior art" is not admitted prior art. The illustrated embodiments, as well as variations thereupon and modifications thereto, are provided for by the present invention, the scope of which is defined by the following claims.

We claimed:

1. A process comprising:

Installing a bundle set of one or more tile bundles, each tile bundle including tile-operation executables, user interfaces, datatype definitions, and metadata, the tile-operation executables, user interfaces, datatype definitions, and metadata being separate from each other, the metadata associating the user interfaces and datatype definitions with the tile-operation executables to define tiles with datatypes defined for arguments to be received and for results to be produced by each tile, each tile declaratively specifying datatypes, each of the tiles having a respective Application Program Interface (API), wherein said user interfaces are provided to a user based upon criteria selected from the group consisting of:

permissions assigned to said user; and a lifecycle stage of a tile corresponding to said user interface;

arranging tiles selected from the bundle set into a first workflow;

triggering, by workflow services, a first tile in a set of tiles arranged in the first workflow, the workflow services being separate from the first workflow;

executing a first operation of the first tile so as to yield a first result;

triggering, by the workflow services, a second tile in the set of tiles arranged in the first workflow;

transferring, via property binding, the first result of the first operation for use as a first argument for a second operation associated with the second tile using a workflow definition which specifies argument data to be populated from a data rack associated with a datatype, the second tile declaratively specifying a first datatype for the first argument;

executing, by the second tile, the second operation to yield a second result that is, at least in part, a function of the first result;

performing a user authentication outside of said first workflow, wherein said permissions assigned to said user being used to allow/prevent access to said user interfaces and other aspects of said first workflow; and determining a selected user interface as a function of said permissions assigned to said user wherein said selected user interface is provided to said user.

2. The process of claim 1 wherein the first result conforms to the first datatype as specified by the first tile, the transferring not involving moving or copying the first result.

3. The process of claim 1 wherein the transferring further comprises transferring data from a source other than the first tile to the second tile to serve as a second argument to the second operation, the second argument conforming to a second datatype declaratively specified by the second tile.

4. The process of claim 3 wherein the data other than the first result is transferred from a data rack, the data being written to the data rack via a utility tile not included in the set of tiles arranged in a workflow.

5. The process of claim 1 wherein the transferring includes translating the first result of the first tile into the first argument of the second tile using definitions of datatypes declaratively specified by the first and second tiles.

6. The process of claim 1 wherein each datatype is a combination of one or more properties, each property having a respective data format.

7. A system comprising non-transitory media encoded with code that, when executed using hardware, implements a process including:

Installing a bundle set of one or more tile bundles, each tile bundle including tile-operation executables, user interfaces, datatype definitions, and metadata, the tile-operation executables, user interfaces, datatype definitions, and metadata being separate from each other, the metadata associating the user interfaces and datatype definitions with the tile-operation executables to define tiles with datatypes defined for arguments to be received and for results to be produced by each tile, each tile declaratively specifying datatypes, each of the tiles having a respective Application Program Interface (API), wherein said user interfaces are provided to a user based upon criteria selected from the group consisting of:

permissions assigned to said user; and a lifecycle stage of a tile corresponding to said user interface;

arranging tiles selected from the bundle set into a first workflow;

triggering, by workflow services, a first tile in a set of tiles arranged in a first workflow, the workflow services being separate from the first workflow;

executing a first operation of the first tile so as to yield a first result;

triggering, by the workflow services, a second tile in the set of tiles arranged in the first workflow;

transferring, via property binding, the first result of the first operation for use as a first argument for a second operation associated with the second tile using a workflow definition which specifies argument data to be populated from a data rack associated with a datatype, the second tile declaratively specifying a first datatype for the first argument;

executing, by the second tile, the second operation to yield a second result that is, at least in part, a function of the first result;

performing a user authentication outside of said first workflow, wherein said permissions assigned to said user being used to allow/prevent access to said user interfaces and other aspects of said first workflow; and determining a selected user interface as a function of said permissions assigned to said user wherein said selected user interface is provided to said user.

8. The system of claim 7 wherein the first result conforms to the first datatype as specified by the first tile, the transferring not involving moving or copying the first result.

9. The system of claim 7 wherein the transferring further comprises transferring data from a source other than the first tile to the second tile to serve as a second argument to the second operation, the second argument conforming to a second datatype declaratively specified by the second tile.

10. The system of claim 9 wherein the data other than the first result is transferred from a data rack, the data being written to the data rack via a utility tile not included in the set of tiles arranged in a workflow.

11. The system of claim 10 wherein the transferring includes translating the first result of the first tile into the first argument of the second tile using definitions of datatypes declaratively specified by the first and second tiles.

12. The system of claim 7 wherein each datatype is a combination of one or more properties, each property having a respective data format.

13. The system of claim 7 further comprising the hardware.

* * * * *